US012480845B2

(12) United States Patent
Moldovan (10) Patent No.: US 12,480,845 B2
(45) Date of Patent: Nov. 25, 2025

(54) MULTIPORT HIGH-PRESSURE FLUID CELL FOR PHOTON AND ELECTRON BEAMS

(71) Applicant: Alcorix Co., Plainfield, IL (US)

(72) Inventor: Nicolaie A. Moldovan, Plainfield, IL (US)

(73) Assignee: ALCORIX CO., Plainfield, IL (US)

( * ) Notice: Subject to any disclaimer, the term of this patent is extended or adjusted under 35 U.S.C. 154(b) by 435 days.

(21) Appl. No.: 17/683,597

(22) Filed: Mar. 1, 2022

(65) Prior Publication Data

US 2022/0283061 A1 Sep. 8, 2022

Related U.S. Application Data

(60) Provisional application No. 63/155,406, filed on Mar. 2, 2021.

(51) Int. Cl.
*G01N 1/28* (2006.01)
*H01J 37/20* (2006.01)

(52) U.S. Cl.
CPC ............... *G01N 1/28* (2013.01); *H01J 37/20* (2013.01)

(58) Field of Classification Search
CPC .................................. G01N 1/28; H01J 37/20
See application file for complete search history.

(56) References Cited

U.S. PATENT DOCUMENTS

| | | | | |
|---|---|---|---|---|
| 9,804,607 B1* | 10/2017 | Coleman | ............... | F28F 21/065 |
| 10,504,688 B2* | 12/2019 | Maebashi | ......... | H01M 10/4285 |
| 2005/0092662 A1* | 5/2005 | Gilbert | ............... | B01L 3/50273 |
| | | | | 210/97 |
| 2015/0256940 A1* | 9/2015 | Dehe | .................... | H04R 19/005 |
| | | | | 381/174 |

OTHER PUBLICATIONS

Pu et al., "Liquid cell transmission electron microscopy and its applications", Royal Society Open Science, 7:191204, 2020, http://dx.doi.org/10.1098/rsos.191204 (Year: 2020).*

(Continued)

*Primary Examiner* — Jay C Kim
*Assistant Examiner* — Woo K Lee
(74) *Attorney, Agent, or Firm* — Leber IP LAW; Celia H. Leber (57) ABSTRACT

A low-cost high-pressure cell to facilitate effective analysis of sample materials with high energy photon and electron beams. In one example, the cell includes a first micro-fabricated semiconductor substrate having a first membrane of a micro-fabricated material formed thereon and including a first membrane-covered region, and a second micro-fabricated semiconductor substrate having a second membrane of the micro-fabricated material formed thereon and including a second membrane-covered region, the first and second micro-fabricated semiconductor substrates being bonded together such that the first and second membrane-covered regions are at least partially aligned. The first and second membrane-covered regions may be separated by at least one spacer layer such that a cavity is formed between the membranes, the cavity being bounded on at least one side by one of membranes. Access to the cavity may be provided by micro-fabricated trenches cut into at least one of the first and second micro-fabricated semiconductor substrates.

18 Claims, 11 Drawing Sheets

(56) References Cited

OTHER PUBLICATIONS

Kono, Yoshio; et al., "Toward Comprehensive Studies of Liquids at High Pressures and High Temperatures: Combined Structure, Elastic Wave Velocity, and Viscosity Measurements in the Paris—Edinburgh Cell", Physics of the Earth and Planetary Interiors 228 (2014), available online Sep. 18, 2013, pp. 269-280.

Rosner, Benedikt; et al., "7nm Spatial Resolution in Soft X-ray Microscopy", Microscopy and Microanalysis 24 (Suppl 2), 2018, pp. 270-271.

Kono, Yoshio; et al., "X-ray Imaging for Studying behavior of Liquids at High Pressures and High Temperatures Using Paris-Edinburgh Press", Review of Scientific Instruments 86, 072207 (2015); published online Jul. 23, 2015, 10 pgs.

\* cited by examiner

MULTIPORT HIGH-PRESSURE FLUID CELL FOR PHOTON AND ELECTRON BEAMS

CROSS REFERENCE TO RELATED APPLICATIONS

This application claims priority and the benefits under 35 U.S.C. § 119(e) to U.S. Provisional Application No. 63/155,406 filed on Mar. 2, 2021 and titled MULTIPORT HIGH-PRESSURE FLUID CELL FOR PHOTON AND ELECTRON BEAMS, which is herein incorporated by reference in its entirety.

BACKGROUND

The use of microfabrication on semiconductor substrates is a mature and versatile means of forming a wide range of devices mostly for electronics and integrated circuits. Many processes are routinely used for these purposes, including photolithography, etching, deposition of various materials (often by gaseous vapor deposition), implantation of dopant atoms, thermal processing, and the like. However, the technology has also been applied to the fabrication of Micro-Electro-Mechanical Systems, which are often referred to as "MEMS" devices. Some of the advantages of the use of micro-fabrication are the low cost of processing, the capability to produce many identical devices at the same time, and the miniaturization of the resultant devices.

Existing high-energy photon beam (typically x-ray) cells includes diamond anvil cells and also "Paris-Edinburgh" cells, as described in Kono et al, "Towards comprehensive studies of liquids at high pressures . . . ", Physics of the Earth and Planetary Interiors, 228, (2014), 269-280, and Kono et al., "X-ray imaging study of liquids at high pressures and high temperatures using Paris-Edinburgh Press.", Review of Scientific Instruments 86, 072207 (2015). Paris-Edinburgh cells are macroscopic devices that can be used to achieve high pressures through the use of highly durable materials (including diamond) and an appropriate fabrication sequence. These cells can be used to achieve pressures that approach those of diamond anvil cells with larger cell/sample sizes than can be achieved with diamond anvil cells. Imaging of molten materials at high pressure is also possible with these cells. However, the cost of these cells is quite high and access to the interior to image the liquids can be a challenge.

SUMMARY OF INVENTION

Aspects and embodiments of the present invention pertain to analysis of fluids at high pressure by high energy electron or photon beams. More particularly, aspects and embodiments describe a low-cost microfabricated high pressure cell capable of "bridging the gap" between conventional low-pressure cells and small high-pressure diamond anvil cells.

According to certain embodiments, the above-noted advantages of micro-fabrication processes are very useful for the purpose of producing a micro-sized membrane-based fluid cell to support pressures in the range of one to a few hundreds bar. In certain examples, the cell's largest dimension is usually less than 500 micrometers ($\mu m$) and is typically on the order of a few $\mu m$ with a thickness dependent upon the cell dimensions. In addition, the resultant cells should allow the entry and exit of the analysis beam(s) and this requires thin membranes with high transparency to the probe beam (e.g., e-beam or x-ray). Such a thin membrane tends to be more structurally sound when it encloses a smaller cavity. The miniaturization of the cavity is therefore preferred according to certain embodiments. Sub-micron beam size focusing of high energy electron beams and x-rays has already been demonstrated in the prior art, for example, as discussed in Rösner et. al., 7 nm Spatial Resolution in Soft X-ray Microscopy, Microsc. Microanal. 24 (Suppl 2), 2018, doi:10.1017/S1431927618013697. However, even with these limitations, aspects and embodiments of the present invention may produce an analysis cell capable of operating at high pressures of up to few hundred bar, that can host relatively large amounts of analyte (e.g., tens of femtoliters (fl)) compared to diamond-anvil high pressure cells functioning at $10^5$ to $10^6$ bar but being capable of accommodating only sub-fl volumes of analyte. Thus, embodiments of the present invention may provide more flexibility in the choice of the conditions of the analyzed sample and its environmental conditions and bridge the pressure domain between atmospheric pressure and the GPa domain.

As discussed in more detail below, aspects and embodiments provide an innovative approach to reduce the cost of a cell for the imaging of liquids at high pressure and to facilitate the examination of these liquids through a thin membrane, representing a significant advance over the prior art.

According to one embodiment, a device for analysis of a material at high pressure comprises a first micro-fabricated semiconductor substrate having a first membrane of a micro-fabricated material formed thereon and including a first membrane-covered region, and a second micro-fabricated semiconductor substrate having a second membrane of the micro-fabricated material formed thereon and including a second membrane-covered region, the second micro-fabricated semiconductor substrate being bonded to the first micro-fabricated semiconductor substrate such that the first and second membrane-covered regions are at least partially aligned with one another. The first and second membrane-covered regions are separated by at least one spacer layer such that a cavity is formed between the first and second membranes, the cavity being bounded on opposing sides by the first and second membranes, and access to the cavity is provided by micro-fabricated trenches cut into at least one of the first and second micro-fabricated semiconductor substrates.

According to another embodiment, a device for analysis of a material at high pressure comprises a first micro-fabricated semiconductor substrate having a first membrane of a micro-fabricated material formed thereon and including a first membrane-covered region, the first micro-fabricated semiconductor substrate further having a first spacer layer formed thereon at least partially outside of the first membrane covered region, and a second micro-fabricated semiconductor substrate having a second membrane of the micro-fabricated material formed thereon and including a second membrane-covered region, the second micro-fabricated semiconductor substrate further having a second spacer layer formed thereon at least partially outside of the second membrane covered region; the second micro-fabricated semiconductor substrate being bonded to the first micro-fabricated semiconductor substrate such that the first and second membrane-covered regions are at least partially aligned with one another. The first and second spacer layers are in contact with one another and the first and second membrane-covered regions are separated by the first and second spacer layers such that a cavity is formed between the first and second membranes, the cavity being bounded on opposing sides by the first and second membranes, and wherein access to the cavity is provided by a plurality of micro-fabricated trenches cut into at least one of the first and second micro-fabricated semiconductor substrates.

Some implementations of the devices include one or more of the following features.

In certain examples, the device further includes a pressure sensing device responsive to pressure inside the cavity, and an electrical connection mechanism connecting the pressure sensing device to at least one electrical contact on at least of the first and second micro-fabricated semiconductor substrates.

In certain examples, the first and second micro-fabricated semiconductor substrates are offset bonded to one another with the at least one electrical contact positioned to be accessible for external connection after bonding of the first and second micro-fabricated semiconductor substrates.

According to certain examples, the pressure sensing device includes a piezo-resistive material disposed on a surface of at least one of the first and second membranes, the piezo-resistive material configured to respond piezo-resistively to pressure-induced deformation of the surface of the at least one of the first and second membranes. In one example, the piezo-resistive material is boron-doped silicon. In another example, the first and second membranes are made of silicon nitride. The membranes may have a thickness in a range of 0.05 micrometers to 10 micrometers.

In certain examples, the cavity is approximately rectangular in lateral and vertical cross-section. The cavity may have lateral dimensions in a range of 0.5 to 5 micrometers ($\mu$m) and vertical dimensions in a range of 0.025 $\mu$m to 2 $\mu$m, for example. In other examples, the cavity may have dimensions in the tens to hundreds of micrometers.

According to certain examples, the trenches include at least one trench formed in each of the first and second micro-fabricated semiconductor substrates, the trenches being formed outside of a volume of the cavity and with fluid connection to the cavity. In one example, the trenches provide fluid access to the cavity and the material being analyzed is a fluid material. In one example, the trenches are V-shaped trenches. In certain examples, the device further includes a corresponding at least one capillary tube inserted inside the at least one trench to allow high pressure fluid access to the cavity. The capillary tube(s) may be glass tubes, for example.

In certain examples, the spacer layer(s) is made of silicon dioxide. A microfabrication process of the first and second micro-fabricated semiconductor substrates may include the deposition and patterning of a silicon dioxide layer as the spacer between the two membranes. In certain examples, the silicon dioxide spacer layer is between 10 nanometers (nm) and 10 micrometers in thickness, typically 50 nm to 70 nm, and the vertical dimension of the cavity is approximately equal to twice the thickness of this silicon dioxide layer.

According to certain aspects and examples, the membranes have transmittance of at least 10% of the incoming energy of a photon beam of average photon energy of at least 1 keV or an incoming electron beam of at least 1 keV.

In one example, with a membrane thickness in the range noted above, the device may be configured to withstand a burst pressure in the cavity of between 1 and 70 bar (10 kPa-7 GPa) without failure. In certain examples, the shape of the boundary of a region of the membrane that is not covered by piezo-resistive material is configured to optimize the burst resistance of the membrane.

In certain examples, the first and second micro-fabricated semiconductor substrates are essentially identical.

The substrates may be comprised of single crystal silicon, for example.

In certain examples, a material of the first and second spacer layers may be selected from the group consisting of phosphorus silicon glass (PSG), boron-phosphorus silicon glass (BPSG), and metal. In other examples, the spacer layers may be made of other materials, as will be appreciated by those skilled in the art, given the benefit of this disclosure.

In certain examples, each of the first and second membranes are made of a material selected from the group consisting of: silicon carbide, diamond, silicon carbon nitride, and amorphous carbon. In other examples, the membranes may be made of other materials, as will be appreciated by those skilled in the art, given the benefit of this disclosure.

At least a portion of the cavity may be formed by etching from the backside of the semiconductor substrate(s).

According to certain embodiments, a method of forming a high-pressure cell for electron or photon-beam examination of an analyte liquid includes steps of micro-fabricating a spacer on at least two dies of a semiconductor substrate, micro-fabricating bonding areas on a surface of each of the at least two dies, and forming a thin membrane on each of the at least two dies, the thin membrane at least partially overlapping the spacer. The method may further include forming at least two trenches on a surface of the semiconductor substrate, separating the at least two dies by dicing the semiconductor substrate, and bonding a first die of the at least two dies to a second die of the at least two dies using the bonding areas on the first and second dies thereby forming a cavity between the first and second dies, wherein the thin membrane covers a side of the cavity. Fluid access to the cavity is provided by the at least two trenches on the surface of the semiconductor substrate.

Another embodiment is directed to a method of forming a high-pressure cell for electron or photon-beam examination of an analyte liquid, the method including steps of micro-fabricating a thin membrane covering at least a portion of a window area on each of a first semiconductor substrate and a second semiconductor substrate, and micro-fabricating a spacer on each of the first and second semiconductor substrates, the spacer partially overlapping the thin membrane. The method may further include forming electrical contacts on each of the first and second semiconductor substrates, and forming trenches on each of the first and second semiconductor substrates. The method may further include aligning and bonding the first and second semiconductor substrates together such that the spacers are in contact with one another and a cavity is formed between the first and second semiconductor substrates bounded on opposing sides by the thin membranes; wherein the trenches provide fluid access to the cavity, wherein at least one of the electrical contacts is positioned outside of the cavity; and wherein a vertical dimension of the cavity, extending between the thin membranes, is twice a thickness of the spacer.

Some implementations of the methods include one or more of the following features.

In one example, forming the electrical contacts includes boron doping regions of each of the first and second semiconductor substrates.

According to certain examples, the steps of micro-fabricating the thin membrane and micro-fabricating the spacer include depositing and patterning of a composite layer including a first material and a second material, and etching the patterned composite layer to remove the second material in a first area and produce the thin membrane, remaining areas of the second material forming the spacer. In one example, the steps of depositing and patterning the composite layer include depositing and patterning a composite layer in which the first material is silicon nitride and the second material is silicon dioxide.

In certain examples, the methods further include forming a piezo-resistive material on a surface of the thin membrane, the piezo-resistive material configured to respond piezo-resistively to pressure-induced deformation of the surface of the thin membrane. In one example, the piezo-resistive material is formed by boron-doping regions of the semiconductor substrate.

According to certain examples, the first and second semiconductor substrates are regions of a common semiconductor substrate, and the method further includes dicing the common semiconductor substrate to separate the first and second semiconductor substrates.

In one example, the method further includes etching a backside of the semiconductor substrate to form the window area.

In certain examples, forming the trenches includes depositing a masking layer on the semiconductor substrate, and patterning and etching the masking layer to provide access to cut the trenches into the semiconductor substrate outside of the cavity. In one example, depositing the masking layer includes depositing silicon nitride. In another example, depositing the masking layer includes performing an LPCVD deposition of silicon nitride. The method may further include inserting capillary tubes into the trenches. In certain examples, forming the trenches includes cutting V-shaped trenches into each of the first and second semiconductor substrates.

Still other aspects, embodiments, and advantages of these exemplary aspects and embodiments are discussed in detail below. Embodiments and implementations disclosed herein may be combined with other embodiments and implementations in any manner consistent with at least one of the principles disclosed herein.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to microfabricated high pressure cells that can be used for fluid analysis, and to methods for producing the cells.

Figure 1:
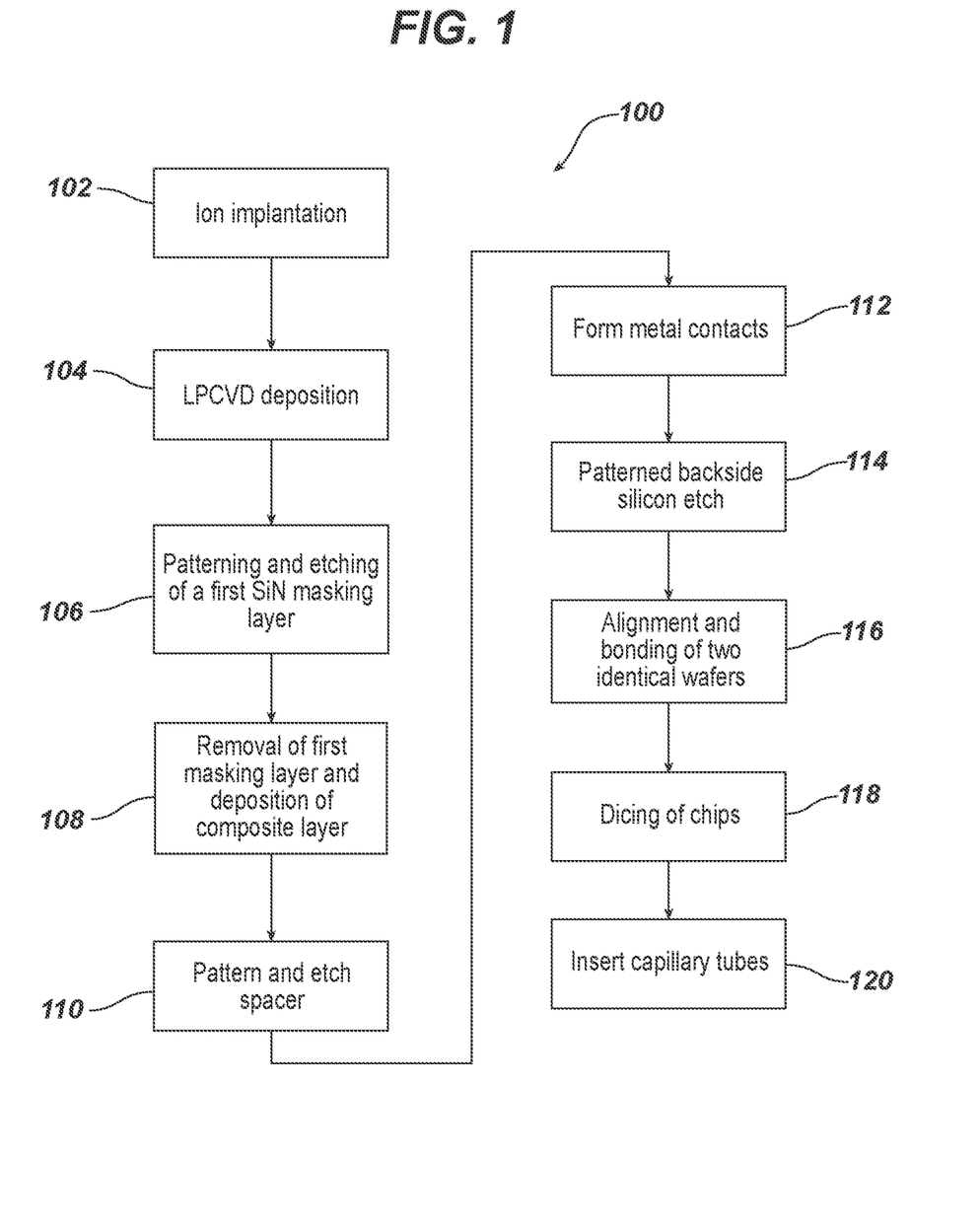
FIG. 1 is a flow diagram of an example of a fabrication process for a cell according to aspects of the present invention.

FIG. 1 illustrates a flow diagram for one example of a fabrication process sequence for a preferred embodiment of the invention to form a cell cavity bounded by at least one thin membrane of a window to allow probing of the cavity by a high-energy electron or photon beam. FIGS. 2A-I illustrate examples of a device fabricated according to the process of FIG. 1 at different stages of the process. According to certain examples, the fabrication process utilizes typical prior art semiconductor processing steps arranged in a novel manner to allow the fabrication of a novel fluid containing cell or device capable of withstanding high pressures.

Figure 2A:
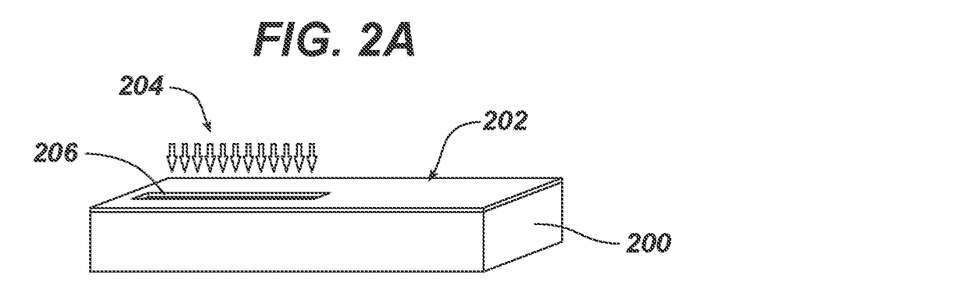
FIGS. 2A-I are diagrams illustrating an example of the cell at various stages of the fabrication process of FIG. 1, according to aspects of the present invention.
Figure 2B:
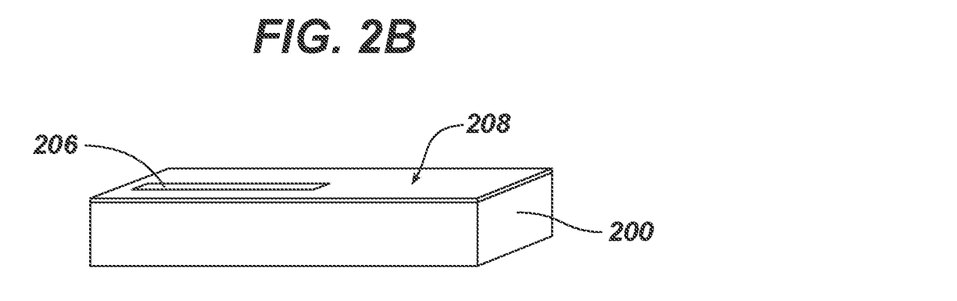
Figure 2C:
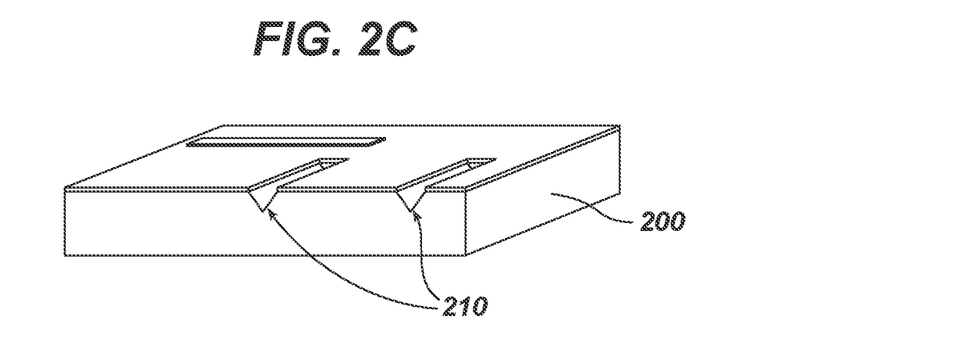
Figure 2D:
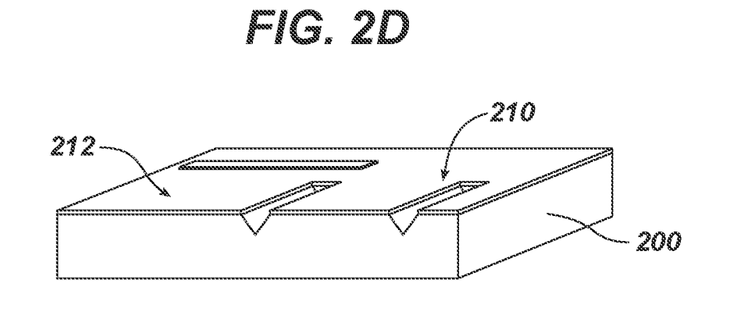
Figure 2E:
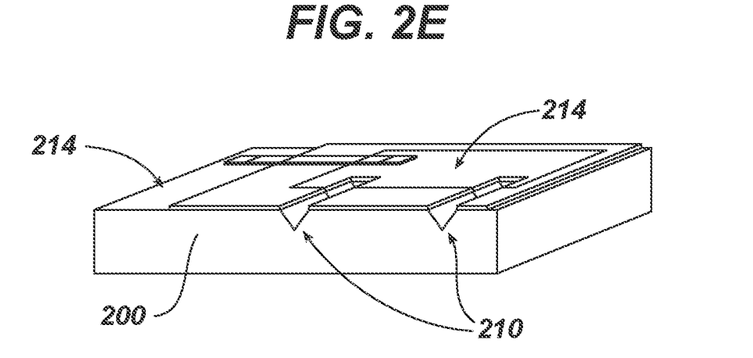
Figure 2F:
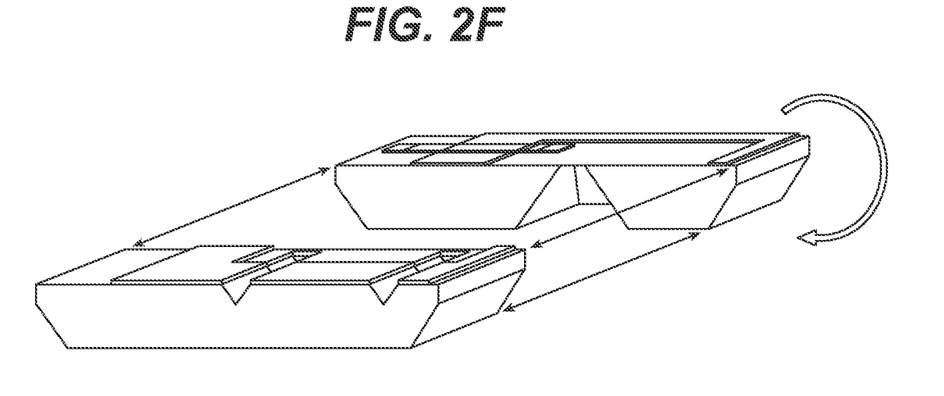

Referring to FIGS. 1 and 2A, according to one embodiment, the starting point for the micro-fabrication processing sequence 100 is preferably a single crystal silicon (Si) substrate 200 of typical thickness in the range of 300 µm to 1200 µm. Said substrate 200 is patterned with photoresist 202 (using conventional patterning processes) to a thickness in the range of approximately 1-2 µm. A window 216 (see FIG. 2I) is patterned into the photoresist 202 in a series of identical die areas corresponding to future devices to be fabricated into the silicon substrate 200. In step 102, a boron ion implant, represented by arrows 204 in FIG. 2A, is conducted in order to produce heavy boron doping in the silicon (Si) semiconductor substrate 200. In one example, the boron ion implant is of approximately 10-30 keV to produce heavy born doping in the substrate 200 in the range of $\sim 10^{19}$ to $10^{21}$ boron dopant atoms per cubic centimeter (cm3) with a vertical dopant extent into the substrate 200 in the range of 100-500 nanometers (nm). According to certain embodiments, the patterned area of boron doping on the surface of the Si substrate 200 is pre-selected so as to correspond to an area on each die that will become the window area of the device to be patterned into the substrate. A compact area in the middle of the doped area is preferably left undoped/un-implanted (indicated by circle 318 in FIGS. 3, 5A and 5B), that will allow a thin membrane 302 without B-doped Si coverage to be formed in a later step. The area of boron doping is also patterned to extend out into the Si substrate 200 outside of the window area in order to electrically connect the window area by boron-doped (p-doped) Si, with electrical contacts (e.g., 306 shown in FIGS. 3, 5A, and 5B) to be formed on the Si substrate 200 outside of the window area. In certain examples, regions of B-doped silicon form "pads" 304 partially extending over thin membrane 302 to provide a piezo-resistive pressure sensing mechanism, as discussed further below. An example of the specific configuration of the B-doped silicon as a conductor to monitor pressure-induced deformation in the window material by piezo-resistive means is illustrated in detail in FIG. 3 and FIGS. 4A-D, as discussed further below. A conductive B-doped Si line 206 is illustrated in FIG. 2A to contact the window area.

The next processing step, after photoresist removal and cleaning according to conventional processes, is an LPCVD deposition step 104. In one example, step 104 includes an LPCVD deposition of a masking layer 208 of silicon nitride (SiN). In certain examples, the SiN masking layer 208 may be approximately 300 nm thick, for example, having a thickness is a range of 100 nm to 500 nm. See FIG. 2B. The silicon nitride, in layer 208 and as used elsewhere in embodiments of the devices disclosed herein, can be of various compositions, from stoichiometric Si3N4 to Si-rich nitride, with generic chemical formula SiNx. Accordingly, the abbreviation SiN used herein does not designate the composition, but rather is a symbolic abbreviation.

The next processing step 106 is the patterning and etching of the first SiN masking layer 208, which may be accomplished using conventional processes, to open windows for trenching into the Si substrate 200 outside of the area that will become the cavity bounded at top and bottom by membranes in order to facilitate fluid access to the volume of the cavity. The trenching may be accomplished by various means. In certain examples it is preferably a V-shaped trench 210 etched into the Si substrate 200 with a solution of KOH according to conventional processes masked by the presence of the ~300 nm of masking layer 208 of SiN outside of the trench area. See FIG. 2C, which shows an example of the trenches 210 formed in the substrate 200.

Still referring to FIG. 1, the next step 108 in a preferred embodiment of the micro-fabrication sequence 100 is the removal of the first SiN masking area 208 from the front side of the wafer 200 and the deposition and patterning of a second composite layer 212 of SiN and SiO2 to mask the area outside of the cavity and to provide raised areas of SiO2 for bonding between two dies of the final device. See FIG. 2D. According to certain embodiments, after deposition of the composite SiN/SiO2 layer, the SiO2 is patterned and etched with photoresist as a masking layer and a Buffered Oxide Etch (BOE) according to the conventional methods, to open up the areas that will become the very thin membrane-bounded area of the high-pressure cavity by etching only the oxide and leaving the SiN (step 110). The remaining (unetched) SiO2 layer 222 (See FIGS. 5A and 5B) forms a spacer layer. The thickness of the SiO2 will therefore become half of the height of the cavity once the device has completed fabrication. The areas of unetched SiO2, which are raised relative to the deposited nitride will become available for bonding in subsequent steps. See FIGS. 4C and 4D. In certain examples, as discussed above, the membranes 302 are formed of SiN (from the composite layer of SiN and SiO2); however, in other examples, another material may be used instead of SiN. For example, the membranes 302 may be formed of silicon carbide, tantalum carbide, silicon dioxide, diamond, diamond-like carbon, graphite, graphene, boron carbide, or boron nitride. The membranes 302 may have a thickness in a range of 0.05 micrometers to 10 micrometers, for example. Similarly, materials other than SiO2 can be used as the other material in the composite layer 212 and become the spacer layer 222. For example, the spacer layer 222 (also 312) may be made of phosphorous silicon glass (PSG), boron-phosphorous silicon glass (BPSG), metal, or other materials.

The next step 112 in the process sequence 100 is a deposition and patterning, according to conventional methods, of metal contacts on the surface of the dies. In certain examples, the metal contacts are deposited as a metal film 214. In certain examples, the metal film thickness has to be less than the thickness of the SiO2. If thicker metal layers are desired, a recess can be patterned into the Si substrate 200 at the beginning of the fabrication sequence 100 prior to the boron ion implantation step 102. Platinum metal can be chosen for this step. See FIG. 2E.

The next step 114 in the process sequence 100 is a patterned backside silicon etch, performed according to conventional etching methods, utilizing the previous stack of first and second deposited SiN layers as an etch stop in the windows for further etching the Si substrate 200 to release the membranes and in areas that are predesignated for dicing of the chips. See FIG. 2F.

Figure 2G:
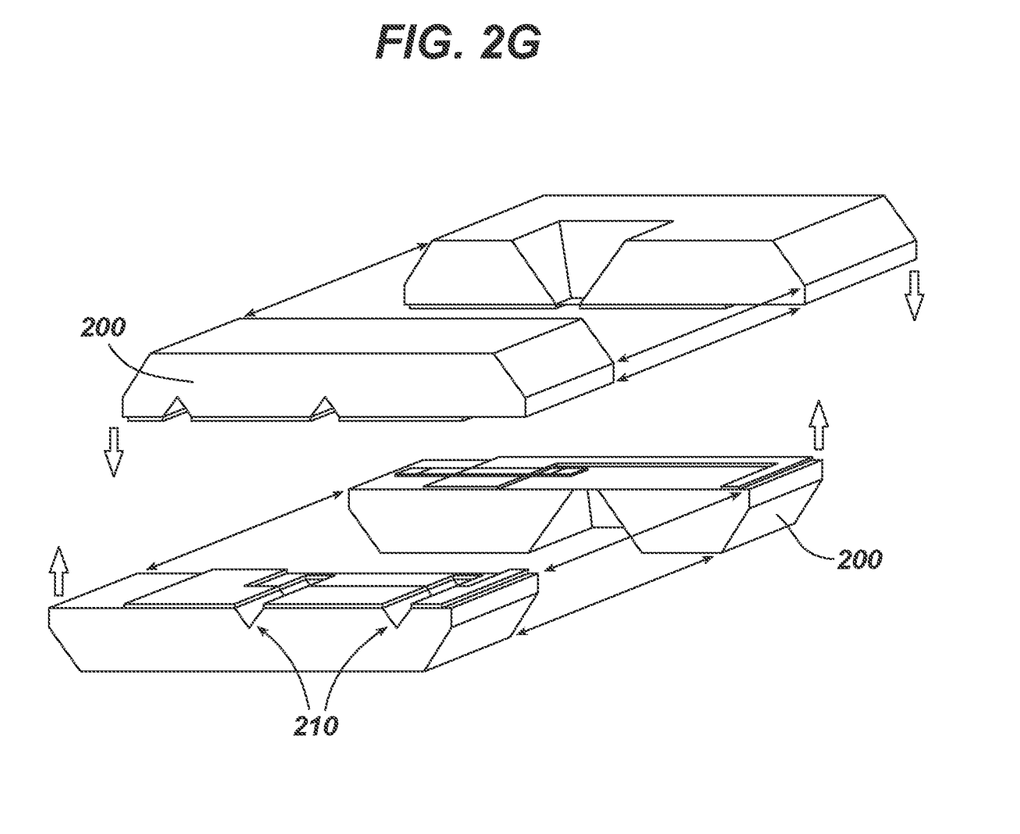
Figure 2H:
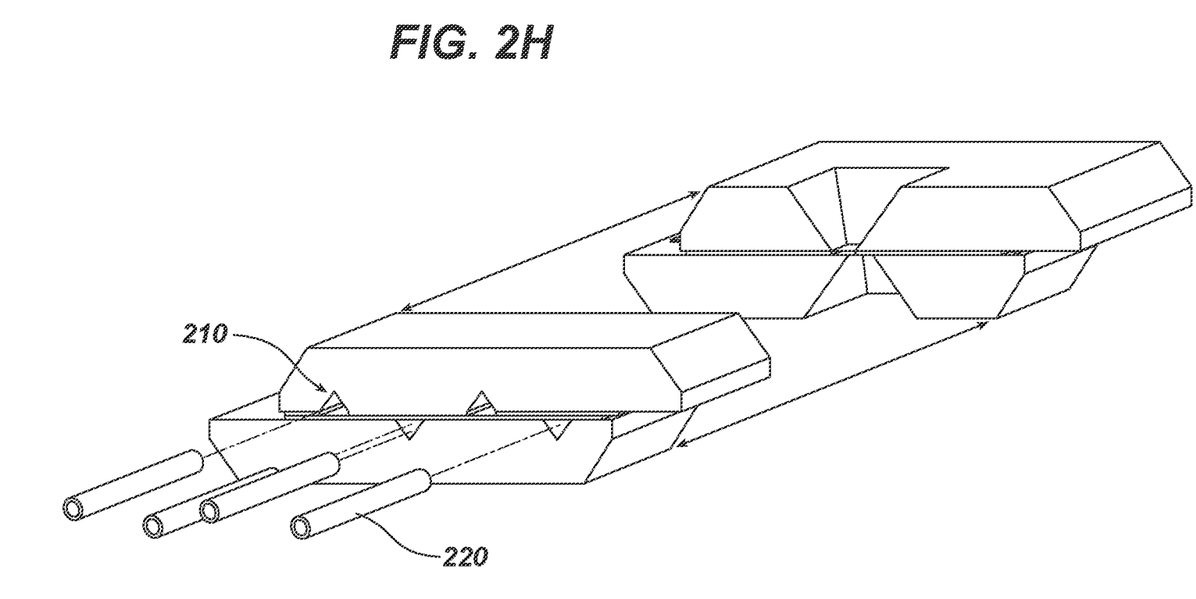
Figure 2I:
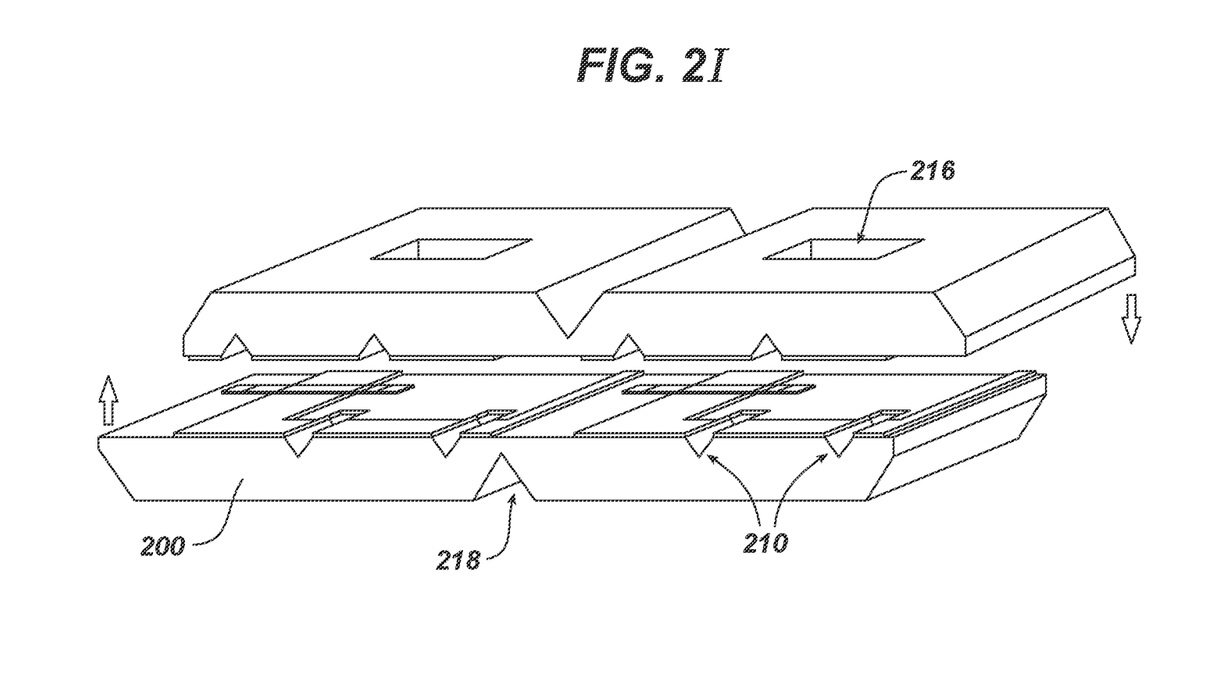

Referring to FIGS. 1 and 2G, the next step 116 in the process sequence 100 is the bonding with alignment of two identical wafers, each carrying multiple die areas corresponding to multiple devices, and fabricated according to steps 102 to 114 discussed above. One wafer is flipped upside-down relative to the other, and two are aligned and bonded together. According to certain embodiments, the alignment is accomplished with a horizontal offset, as shown in FIG. 2G, so that one set of bond pads is uncovered for subsequent contact to the metal pads from outside the chip. The alignment of the wafers may be offset with sufficient clearance to permit contact areas for bonding. According to certain embodiments, the bonding between the two wafers is facilitated by a SiO2-SiO2 bond between raised areas of SiO2 312 from the deposition of the composite layer 212 of SiN and SiO2 discussed above. FIG. 2I shows another view of the offset bonded wafers. In the example illustrated in FIG. 2I, two devices/chips are shown side-by-side with a groove 218 between them that corresponds to an area predesignated for dicing (separating) of the chips as discussed above.

Thus, each device includes a cavity that corresponds to the space between the two bonded wafers caused by the height of the remaining thickness of the SiO2 (spacers 312 shown in FIGS. 4A-D, corresponding to regions of the spacer layer 222) left after the etch in step 108. In each device/chip, the cavity is positioned beneath the window area 216. The cavity is at least partially bounded by the membrane 302 formed in step 110 as discussed above. In certain examples, the cavity is approximately rectangular in lateral and vertical cross-section. However, in other examples, the cavity may have a different shape. The shape of the cavity need not be geometrically "regular," but may include complex shapes. In certain examples, lateral dimensions of the cavity are in a range of 0.5 to 5 micrometers (µm) and vertical dimensions of the cavity are in a range of 0.025 µm to 2 µm. In other examples, the dimensions of the cavity may be on the order of tens of micrometers to hundreds of micrometers. Trenches 210 provide access to the cavity through the surrounding walls of the substrate 200. The metal contacts and traces formed in step 112 provide electrical connection to the cavity and other features in the window area, as discussed further below.

Subsequent dicing of the chips is performed (step 118). Dicing may be facilitated by the thinning of the chip, which may be accomplished by backside etching. In certain examples, the wafers include a V-groove 218 to facilitate dicing/cleavage.

It will be appreciated by those skilled in the art, given the benefit of this disclosure, that the dicing step 118 alternatively may be performed before the bonding step 116. In this case, the individual dies, rather than wafers including multiple dies, may be aligned and bonded together in the same manner as discussed above.

The next step 120 in the process sequence is the insertion of capillary tubes 220 into the trenches 210 to allow access for the fluid to the cavity. See FIG. 2H. According to certain examples, the capillary tubes 220 may be sealed/glued into the trenches 210. Various epoxy-based glues can be used for this purpose. In certain examples, the capillary tubes are glass tubes. In other examples, the capillary tubes may be made of other materials, such as, but not limited to, metals, composite materials, plastics, for example, or other materials as will be appreciated by those skilled in the art, given the benefit of this disclosure.

Figure 3:
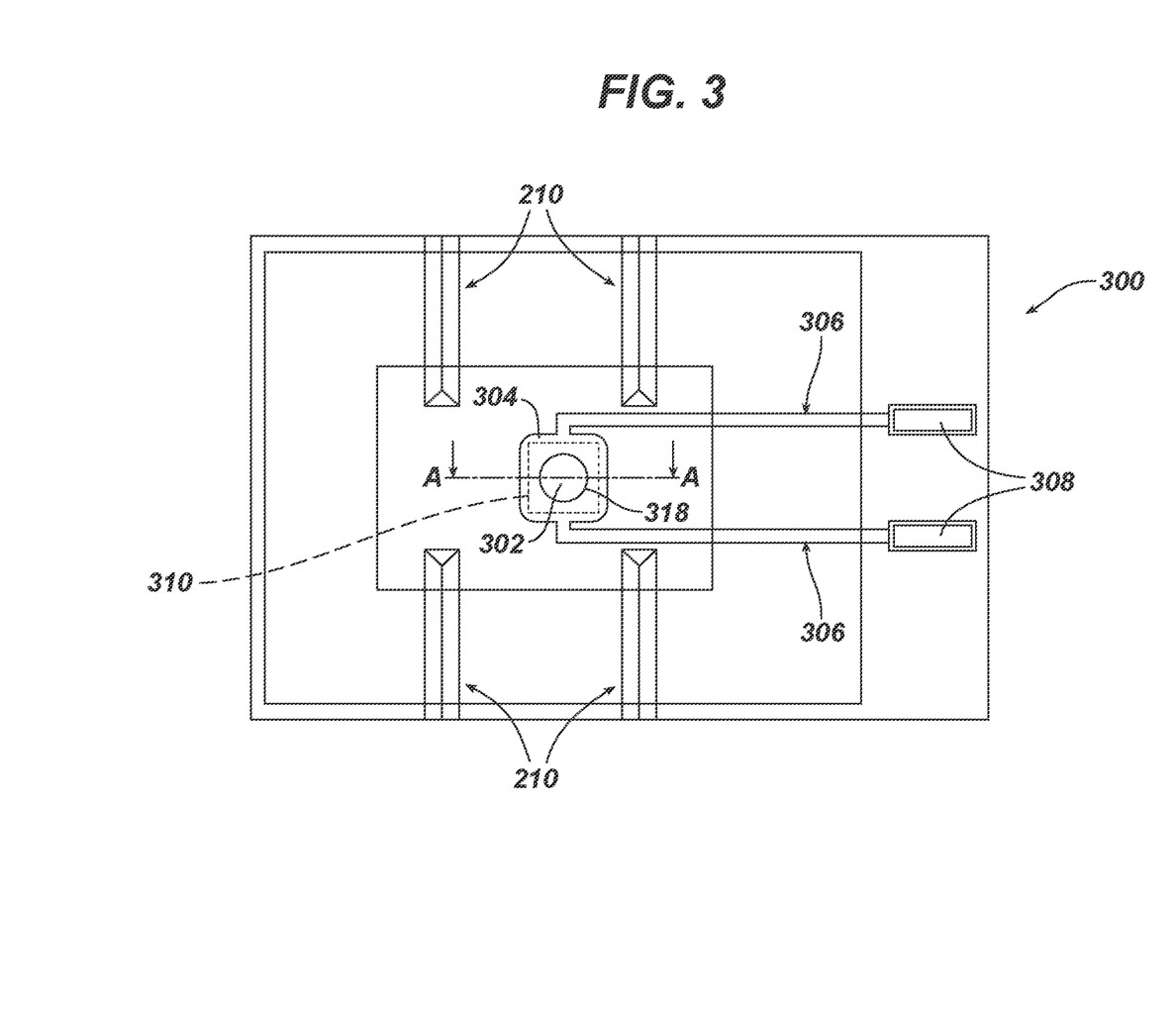
FIG. 3 is a diagram of one example of a device according to aspects of the present invention.

Referring to FIGS. 3 and 4A-D, there is illustrated an example of a device 300 fabricated according to the process discussed above and in accord with aspects of the invention. FIG. 3 shows an example of detailed arrangement of trenches 210 (V-grooves) for the capillary tubes 220. In addition, FIGS. 3 and 4A-D show examples of the piezo-resistive B-doped silicon region or "pads" 304 located on one of the membranes 302 and conductive B-doped silicon traces 306 connecting the piezo-resistive "pads" 304. The membrane 302 which covers the cavity for the liquid under high pressure is represented by the central region bounded by the dotted-line rectangle 310 in FIG. 3. Two V-grooves corresponding to trenches 210 (as "trapezoidal shapes") are illustrated to extend from both the top and the bottom (relative positions in the figure) of the device 300 to allow inflow and outflow of the liquid under pressure.

In the example shown in FIG. 3, the device 300 includes two contact pads 308 that connect (via traces 306) to a piezo-resistor 304 placed on the outskirt of the membrane 302. In FIG. 3, the central circle 318 indicates the boundary of the region of the membrane 302 that is not covered by the boron-doped piezo-resistor 304. It should be noted that the circular shape is representative only. In actual implementation, the boundary 318 may have any of a variety of shapes, which may be simple or complex, geometric or non-geometric. One notable example is the case wherein the shape of the boundary 318 is optimized for reducing the maximum strain concentration in the membrane 302 and thus, maximizing the burst pressure of the membrane. The membrane 302 along with the boron-doped piezo-resistor 304, the boron-doped leads 306 and a metallization of at least two external surfaces for electrical connection 308 act as a pressure sensing device responsive to pressure inside the cavity. As shown in FIGS. 4A-D, the membrane 302 deforms responsive to pressure changes in the cavity, and this deformation can be measured using the piezo-resistive transducer 304 and contact pads 308.

Figure 4A:
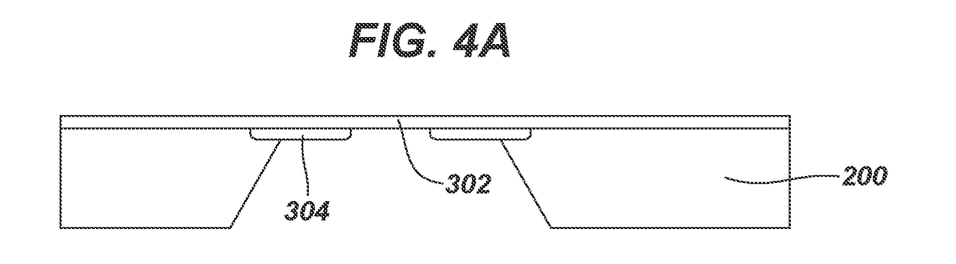
FIGS. 4A-D are cross-sectional diagrams taken along line A-A' in FIG. 3 and illustrating examples of a piezo-resistive boron-doped silicon region and electrical contacts allowing monitoring of the pressure exerted on the thin membrane of window material of the device of FIG. 3, according to aspects of the present invention.
Figure 4B:
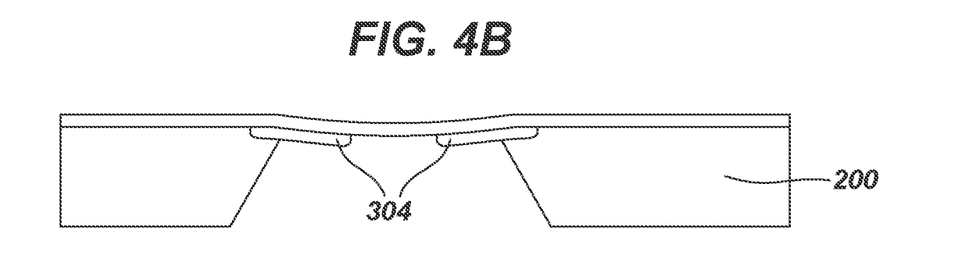
Figure 4C:
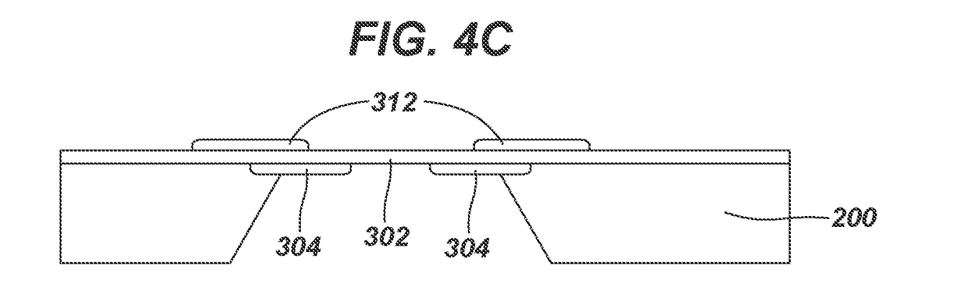
Figure 4D:
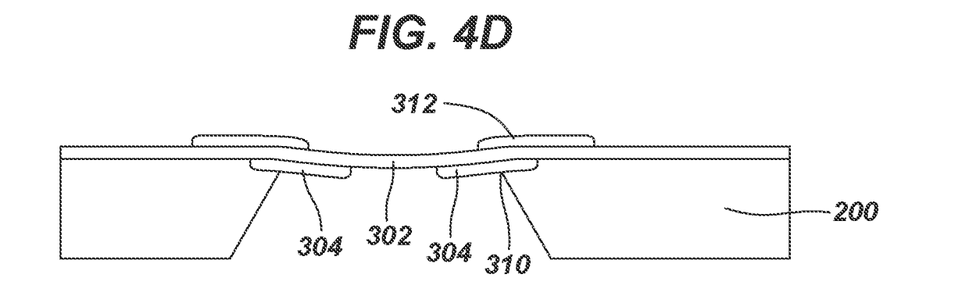

As shown in FIGS. 4C and 4D, and as discussed above, in steps 108 and 110, a spacer layer 222 of remaining/unetched SiO2 is formed, and this layer 222 provides raised areas of oxide 312 (namely SiO2 according to certain examples) formed around the central cavity area. As discussed above, the spacer layer 222/312 is half of the height of the cavity. In the flip-over and bonding step 116, the oxide areas 312 contact one another and may be used as a bonding layer and also as structural material for reinforcing the membrane edge 310 (see FIG. 4D). When the two substrates are offset bonded together as discussed above, the contact pads 308 are left exposed for electrical connection to external devices, for example.

Figure 5A:
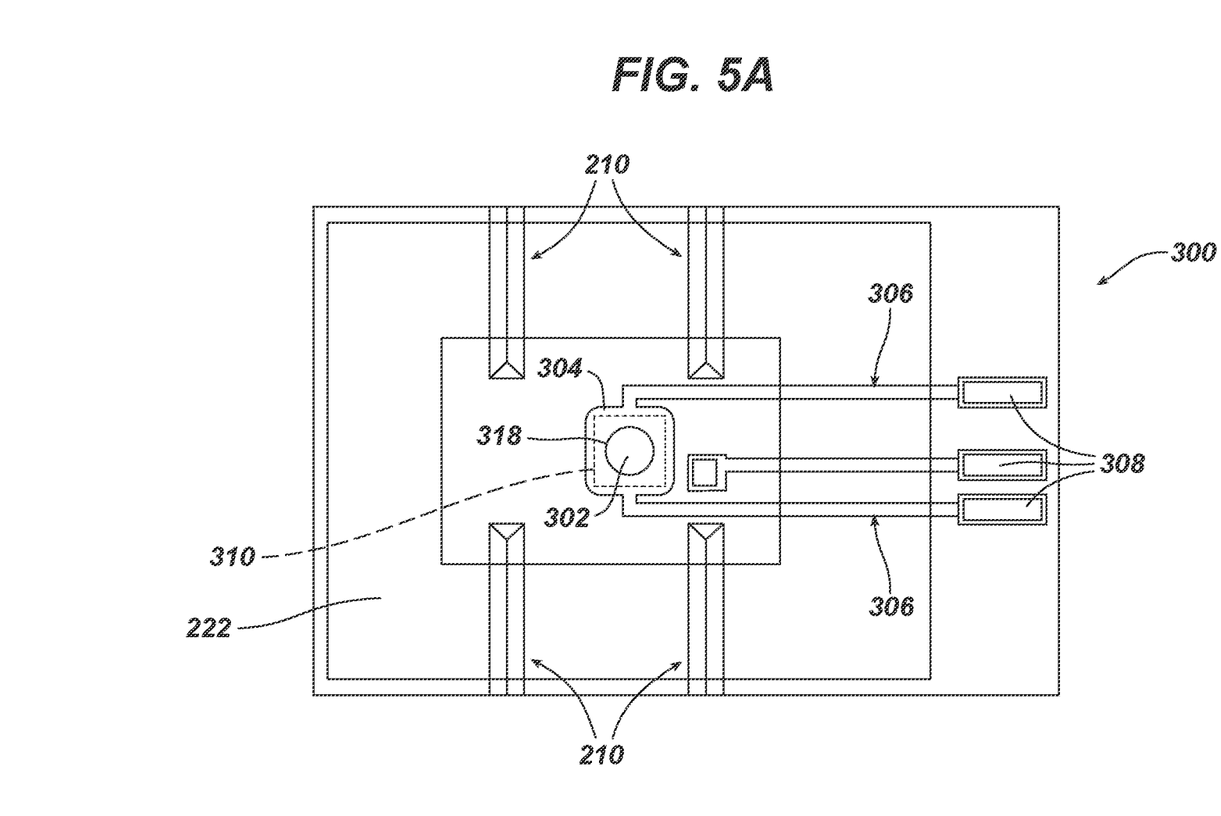
FIG. 5A is a diagram illustrating another example of the device according to aspects of the present invention.
Figure 5B:
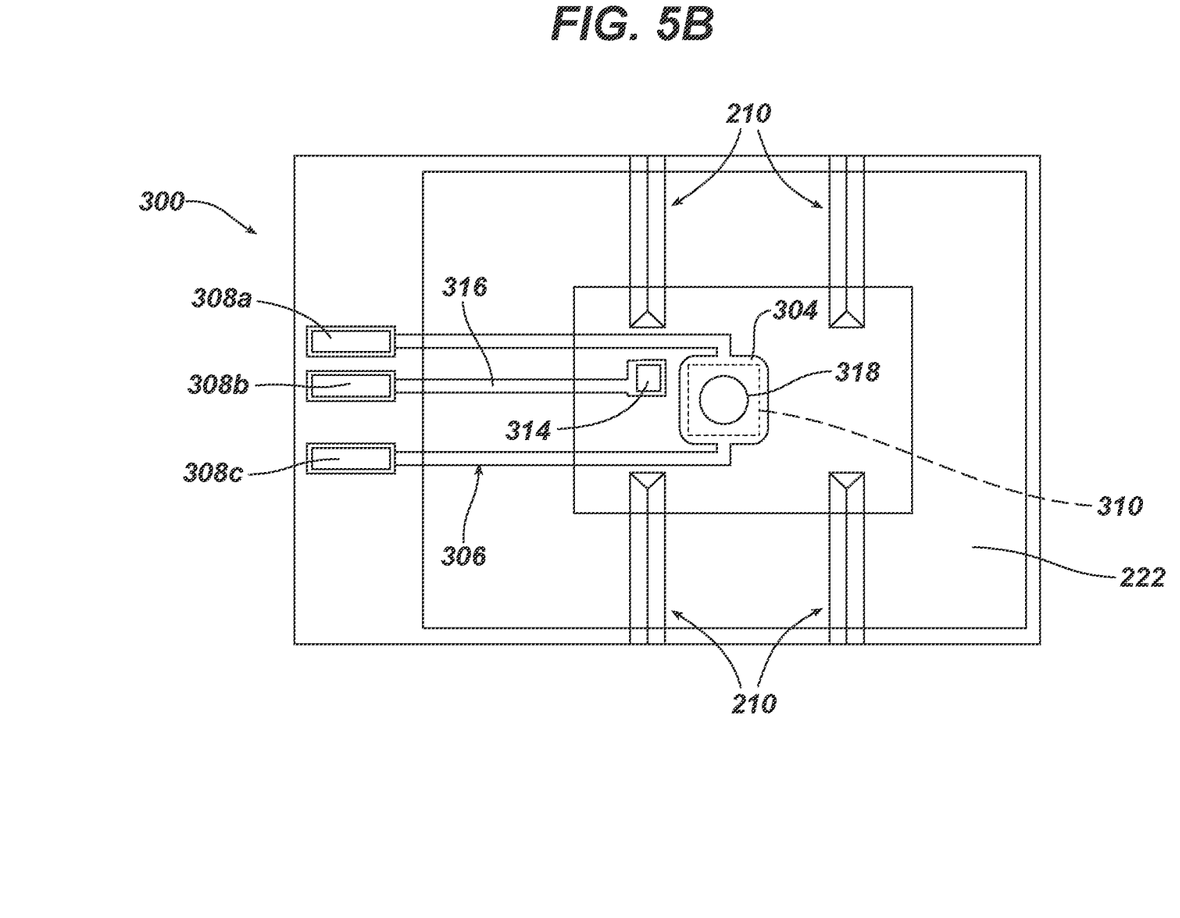
FIG. 5B is a diagram illustrating the device of FIG. 5A flipped in position to show, in combination with FIG. 5A, an arrangement for bonding two of the devices together, in accord with aspects of the present invention.

FIGS. 5A and 5B illustrate an alternative example of the device 300 in which the device incudes an optional electrical contact pad 314. FIG. 5B shows the example of the device 300 in a flipped position relative to the position shown in FIG. 5A, to illustrate an example of an arrangement of the substrates 200 for offset bonding, as discussed above. As shown, in this example, the device 300 includes three contacts 308, namely 308a, 308b, and 308c. The optional electrical contact pad 314 may be used to apply an external voltage to the fluid in the cavity. The electrical contact pad 314 may be connected to a third contact 308b via an additional conductive trace 316, as shown. According to certain examples, additional electrodes for diagnosis of the pressurized medium or for performing electrochemistry processes can be added, which exploit the electrical conductivity of the B+ ion implantation for forming conductive leads and metallization for fabrication of contact pads both external and internal to the high-pressure cavity.

Figure 6:
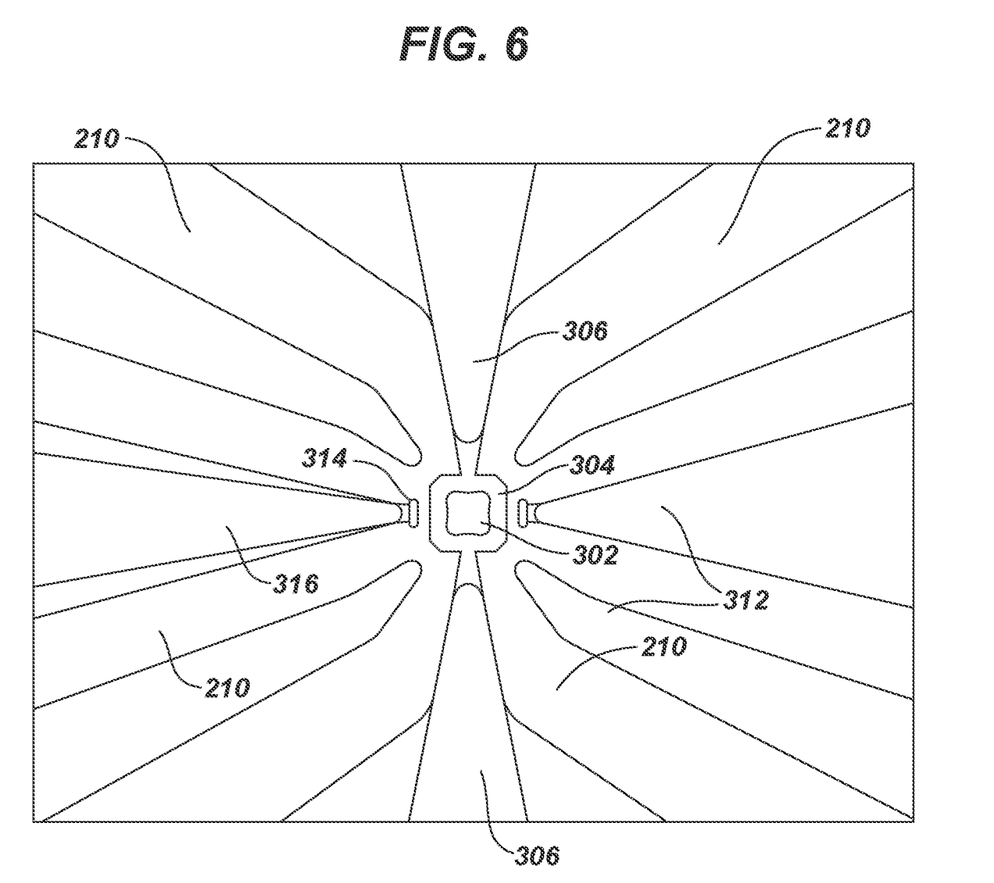
FIG. 6 is a diagram showing an enlarged view of a portion of the device according to aspects of the present invention.

FIG. 6 illustrates an enlarged view of a portion of one embodiment of the device 300 according to certain aspects. In the illustrated example, it can be seen that the inner edge of the piezo-resistor 304, corresponding to the boundary of the uncovered region of the membrane 302 (and designated with reference numeral 318 in FIGS. 3, 5A, and 5B) has a "cloverleaf-type" shape, rather than the diagrammatic or representative circular shape shown in FIGS. 3, 5A, and 5B. As discussed above, this shape may vary and may be geometric or non-geometric in various examples. In certain examples, and as may be seen with reference to FIG. 6, there is not necessarily a hard boundary between the "cavity" (roughly circular central region surrounding the piezo-resistor 304 and membrane 302) and the microchannels or trenches 210 that provide fluid access to the cavity. In the illustrated example, the central circular region may have a diameter of about 150 micrometers in certain examples; however, in other examples the dimensions of the cavity may vary, and the measurements may differ depending on the shape of the cavity and the selected region considered the "cavity" versus the fluidic access channels. Accordingly, the terminology and exemplary dimensions and shapes discussed herein are intended for clarity of description only and not intended to be limiting.

Thus, aspects and embodiments provide a low-cost high-pressure cell to facilitate effective analysis of sample materials with high energy photon and electron beams. According to certain embodiments, the cell is preferably micro-fabricated with appropriately sized trenches onto two dice of a semiconductor substrate which are then bonded together to form a cavity between them for fluids under high pressure. The bonding between the dice is preferably offset to allow electrical contacts with connections to a piezoresistive device inside the cavity for detection of pressure changes inside the cell. Fluid access to the cell can be provided through channels cut into the substrate which can be filled with capillaries for delivery of the fluid. Thin membrane window materials are disposed across the top and bottom of the cell through an appropriate micro-fabrication sequence to allow access to the fluid to be analyzed by the photon and/or electron beams. Embodiments of the low-cost cell described herein allows analysis of samples at higher pressure than most existing cells and with larger volumes than high pressure diamond anvil cells and also allows easy access to the fluid inside the cell volume.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. A device for analysis of a fluid at high pressure, the device comprising:
    a first micro-fabricated semiconductor substrate having a first membrane of a micro-fabricated material formed thereon and including a first membrane-covered region, the first micro-fabricated semiconductor substrate further having a first spacer layer formed thereon at least partially outside of the first membrane covered region; and
    a second micro-fabricated semiconductor substrate having a second membrane of the micro-fabricated material formed thereon and including a second membrane-covered region, the second micro-fabricated semiconductor substrate further having a second spacer layer formed thereon at least partially outside of the second membrane covered region; the second micro-fabricated semiconductor substrate being bonded to the first micro-fabricated semiconductor substrate such that the first and second membrane-covered regions are at least partially aligned with one another;
    wherein the first and second spacer layers are in contact with one another and the first and second membrane-covered regions are separated by the first and second spacer layers such that a cavity configured to receive a fluid to be analyzed, is formed between the first and second membranes, the cavity being bounded on opposing sides by the first and second membranes;
    wherein each of the first and second spacer layers comprises a material selected from the group consisting of phosphorus silicon glass, and boron-phosphorus silicon glass;
    wherein the first and second semiconductor substrates, the first and second membranes, and the first and second spacer layers together define an electrochemical cell; and
    wherein access of the fluid to the cavity is provided by a plurality of micro-fabricated trenches cut into at least one of the first and second micro-fabricated semiconductor substrates.

2. The device of claim 1, further comprising:
    a pressure sensing device responsive to pressure inside the cavity; and
    an electrical connection mechanism connecting the pressure sensing device to at least two electrical contacts on at least of the first and second micro-fabricated semiconductor substrates.

3. The device of claim 2, wherein the first and second micro-fabricated semiconductor substrates are offset bonded to one another with the at least two electrical contacts positioned to be accessible for external connection after bonding of the first and second micro-fabricated semiconductor substrates.

4. The device of claim 2, wherein the pressure sensing device includes a piezo-resistive material disposed on a surface of at least one of the first and second membranes, the piezo-resistive material configured to respond piezo-resistively to pressure-induced deformation of the surface of the at least one of the first and second membranes.

5. The device of claim 4, wherein the piezo-resistive material is boron-doped silicon.

6. The device of claim 1, wherein each of the first and second membranes is made of silicon nitride.

7. The device of claim 6, wherein each of the first and second membranes has a thickness in a range of 0.05 micrometers to 10 micrometers.

8. The device of claim 1, wherein each of the first and second membranes are made of a material selected from the group consisting of: silicon carbide, diamond, silicon carbon nitride, and amorphous carbon.

9. The device of claim 1, wherein the plurality of trenches includes at least one trench formed in each of the first and second micro-fabricated semiconductor substrates, the plurality of trenches being formed outside of a volume of the cavity and with fluid connection to the cavity.

10. The device of claim 9, wherein the plurality of trenches are V-shaped trenches.

11. The device of claim 9, further comprising a corresponding at least one capillary tube inserted inside the at least one trench to facilitate fluid access to the cavity.

12. The device of claim 1, wherein the first and second spacer layers are made of silicon dioxide.

13. The device of claim 12, wherein a thickness of each of the first and second spacer layers is in range of 10 nanometers to 10 micrometers in thickness, and wherein a vertical dimension of the cavity is equal to twice the thickness.

14. A method of forming a high-pressure cell for electron or photon-beam examination of an analyte liquid, the method comprising:
    micro-fabricating a thin membrane covering at least a portion of a window area on each of a first semiconductor substrate and a second semiconductor substrate;
    micro-fabricating a spacer on each of the first and second semiconductor substrates, the spacer partially overlapping the thin membrane;
    forming electrical contacts on each of the first and second semiconductor substrates;
    forming trenches on each of the first and second semiconductor substrates; and
    aligning and bonding the first and second semiconductor substrates together such that the spacers are in contact with one another and a cavity configured to receive a fluid to be analyzed is formed between the first and second semiconductor substrates at least partially bounded on opposing sides by the thin membranes;
    wherein each of the first and second spacer layers comprises a material selected from the group consisting of phosphorus silicon glass, and boron-phosphorus silicon glass; wherein the trenches provide fluid access of the fluid to the cavity; wherein the electrical contacts are positioned outside of the cavity; and wherein a vertical dimension of the cavity, extending between the thin membranes, is twice a thickness of the spacer.

15. The method of claim 14, wherein forming the electrical contacts includes boron-doping regions of each of the first and second semiconductor substrates.

16. The method of claim 14, wherein micro-fabricating the thin membrane and micro-fabricating the spacer include:

depositing and patterning of a composite layer including a first material and a second material; and etching the patterned composite layer to remove the second material in a first area and produce the thin membrane, remaining areas of the second material forming the spacer.

17. The method of claim 16, wherein depositing and patterning the composite layer include depositing and patterning the composite layer in which the first material is silicon nitride and the second material is silicon dioxide.

18. The method of claim 14, further comprising:

forming a piezo-resistive material on a surface of the thin membrane, the piezo-resistive material configured to respond piezo-resistively to pressure-induced deformation of the surface of the thin membrane.

* * * * *